US011610355B1

(12) United States Patent
Francis et al.

(10) Patent No.: US 11,610,355 B1
(45) Date of Patent: Mar. 21, 2023

(54) INTERACTIVE AUGMENTED REALITY (AR) ENTERTAINMENT HUB

(71) Applicants: Jennifer Francis, Salt Lake City, UT (US); Siddardha Vangala, Salt Lake City, UT (US)

(72) Inventors: Jennifer Francis, Salt Lake City, UT (US); Siddardha Vangala, Salt Lake City, UT (US)

(*) Notice: Subject to any disclaimer, the term of this patent is extended or adjusted under 35 U.S.C. 154(b) by 0 days.

(21) Appl. No.: 16/255,228

(22) Filed: Jan. 23, 2019

(51) Int. Cl.
*G06T 13/40* (2011.01)
*G06T 19/00* (2011.01)
*G06T 7/90* (2017.01)
*G06F 3/04845* (2022.01)
*G06T 19/20* (2011.01)
*G09B 19/00* (2006.01)
*G06V 20/20* (2022.01)

(52) U.S. Cl.
CPC .......... *G06T 13/40* (2013.01); *G06F 3/04845* (2013.01); *G06T 7/90* (2017.01); *G06T 19/006* (2013.01); *G06T 19/20* (2013.01); *G06V 20/20* (2022.01); *G09B 19/0053* (2013.01); *G06T 2200/24* (2013.01); *G06T 2207/10024* (2013.01); *G06T 2219/2012* (2013.01)

(58) Field of Classification Search
CPC ...... A63F 13/45; G06F 3/048; G06F 3/04815; G06F 3/04842; G06F 3/0488
See application file for complete search history.

(56) References Cited

U.S. PATENT DOCUMENTS

| 6,132,210 A * | 10/2000 | Lehmann | A61C 19/10 356/408 |
| 11,132,913 B1 * | 9/2021 | Ramanarayanan | G06V 40/23 |
| 2006/0031776 A1 * | 2/2006 | Glein | G06F 3/04815 715/779 |
| 2012/0142429 A1 * | 6/2012 | Muller | A63F 13/69 463/42 |
| 2016/0196692 A1 * | 7/2016 | Kjallstrom | G06F 3/0346 345/633 |
| 2019/0065027 A1 * | 2/2019 | Hauenstein | G06F 3/014 |

* cited by examiner

*Primary Examiner* — Ming Wu
(74) *Attorney, Agent, or Firm* — Lowenstein Sandler LLP (57) ABSTRACT

Systems and methods for manipulating art assets on a user interface that utilizes augmented reality (AR) to create a rewards program through STEM-based learning are described herein. A method includes transmitting an image captured by a first user of one or more images of a tangible object having a reference marker. The method further includes processing the image and in response to detecting the reference marker in the one or more images, transmitting an image of an AR character on a graphic user interface (GUI) along with a first visual programming object (first GUI element) associated with underlying code that, when manipulated on the screen with respect to an execution object, a second GUI element (second visual programming object), causes a change of state of the AR character from a first state to a second state.

20 Claims, 7 Drawing Sheets

INTERACTIVE AUGMENTED REALITY (AR) ENTERTAINMENT HUB

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops, and the like. These devices have also become widely used by children.

BRIEF DESCRIPTION OF DRAWINGS

The examples described herein will be understood more fully from the detailed description given below and from the accompanying drawings, which, however, should not be taken to limit the application to the specific examples, but are for explanation and understanding only.

DETAILED DESCRIPTION

Teaching computer programming on an elementary school level as part of a STEM-based curriculum often implements a hands-on learning experience where the students execute commands on a school provided computer. However, due to the fast pace of technological advancements, the school computers available to the students are often excessively out of date. This is particularly true in Title One elementary schools that are situated in low-income neighborhoods. Because of the underfunding of these schools, common hand-held devices such as tablets and smart phones have exponentially more processing ability than do many of the school computers available to the students. Embodiments of the interactive augmented reality (AR) entertainment hub described herein can be implemented in a mobile application, often referred to as "an app." The interactive AR learning app can be used to teach computer programming skills to children (or those new to programming) using a common hand-held device such as a tablet or a phone. The interactive AR entertainment hub can also be implemented as a system over multiple devices to teach computer programming skills through a reward token based system. An AR entertainment hub can include a client computing device, a data server, and data storage. The interactive AR entertainment hub can include client computing devices, a data server and a data store. The client computing devices include a processor that processes images of the camera view, triggering a display of an AR figure on the display as well as icons that the user manipulates. The client computing device also includes a memory device for the interactive entertainment hub. The data server provides the system back-end logic feature. After each action is completed, the user receives a virtual token that later can be redeemed by the user for a reward.

In one embodiment, the interactive AR entertainment hub teaches computer programming skills through an interactive app on a mobile device where a user enters commands by manipulating one or more visual programming objects on a graphical user interface, such as dragging one visual programing object to a visual execution object that triggers execution of the visual programming object's underlying code to trigger animation by an AR figure. Alternatively, the interactive app can be used to permit the user to select a color from a real-world object for a portion of the AR figure. By interacting with the visual programming objects of the app, the user is taught programming skills by performing an action on the display, such as moving one emoji on the screen within certain proximity of another emoji, thereby executing a command for the animation to move according to the underlying code associated with the action. When the user manipulates the visual programming object, the interactive AR entertainment hub displays text that instructs user to tap on the display to confirm a selection of the particular programming object in order to execute the command associated with the selected programming object. This action teaches the user rudimentary steps of computer programming and encourages the user to continue interacting with the interactive AR entertainment hub through a reward system. For example, upon completion of an animation by manipulating the visual programming object to the visual execution object, the interactive AR entertainment hub can reward the user with a reward token. The reward tokens can be used by a parent to encourage further engagement with the interactive AR entertainment hub. Alternatively, the reward tokens can be issued by the interactive AR entertainment hub and the reward tokens can be redeemed at a business participating in a stem-based incentive program. For example, a restaurant could provide the interactive AR entertainment hub in a vendor-specific app. The vendor-specific app can launch the interactive AR entertainment hub by providing a specified marker printed on a tangible object to initiate an AR character on the display along with programming objects that can be manipulated to change the color of features of the AR character or cause the AR character to perform an animation action on the display. For example, the specified marker can be a drawing or image of the AR character and can be printed on a tangible object, such as a brochure, a napkin, or the like. The vendor-specific app could also ask the user to scan an environment and place a 3D object on a desired plane without using a marker. The vendor-specific app could store a user profile with a count of reward tokens issued to a particular user. Once the user satisfied a threshold criterion, the restaurant could provide a coupon, a discount, a monetary award, or a specific menu item in exchange for the achievement. Providing a fun, interactive app with the interactive AR entertainment hub can drive traffic to the restaurant and promote customer loyalty, or the like.

Figure 1:
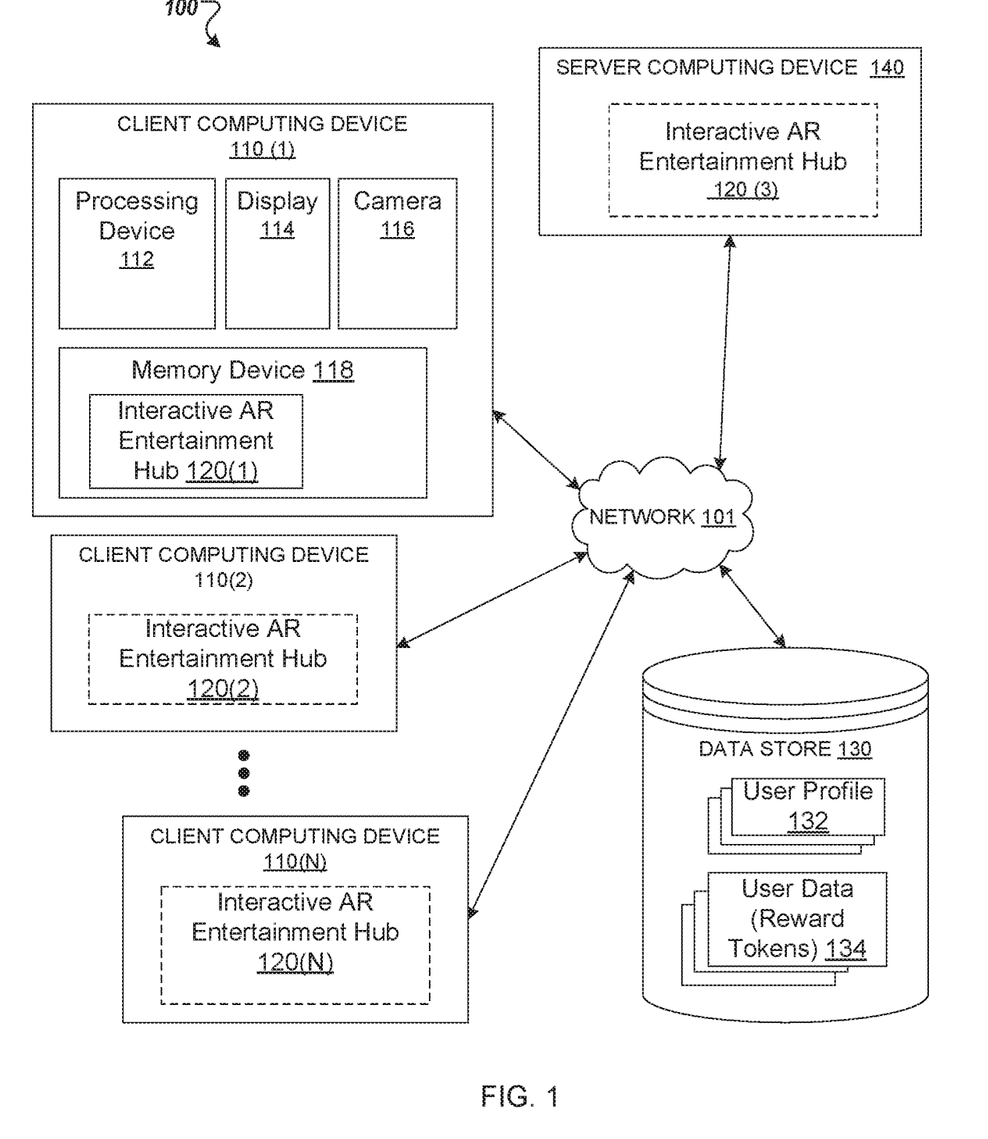
FIG. 1 is a network diagram illustrating a network environment in which computing devices with an interactive augmented reality (AR) entertainment hub can be deployed to teach computer programming skills, according to one embodiment.

FIG. 1 is a network diagram illustrating a network environment 100 in which computing devices with an interactive augmented reality (AR) entertainment hub can be deployed to teach computer programming skills, according one embodiment. The interactive augmented reality entertainment hub can be deployed on a hand-held computing device, a portable device, a mobile phone, a mobile gaming system, glasses, headset, or the like.

The network environment 100 includes multiple computing devices, each including a memory device that can store a copy of the interactive AR entertainment hub 120. The computing devices can be operatively coupled together by a communication network 101. In one implementation, the communications network 101 can use a wide area network (WAN), a local area network (LAN), a virtual private network (VPN), the Internet, and so forth. In another implementation, the communications network 101 can be a transmission control protocol/internet protocol (TCP/IP). The client computing devices 110 can access one or more server computing devices 140.

The server computing devices 140 can be located at one or more data centers. The server computing device 140 can be a workstation, a personal computer (PC), a server blade, or the like, and can be configured to communicate with the client computing devices 110. The communication network 101 can include one or more network devices, such as gateway, edge servers, load balancers, or the like.

The interactive AR entertainment hub 120 can be a mobile app, an application, a web-hosted application that can be accessed via a browser, or the like. The interactive AR entertainment hub 120 can also be deployed on a server computing system 140 that is coupled to one or more client computing devices 110 over a network 101. In addition, the computing devices can be operatively coupled to a data store 130 via the network 101. The data store 130 can store the user profiles 132 and user data tokens 134. Further, the server computing device 140 can perform tasks which may include data analysis, storage, data manipulation, archiving, or the like. In one embodiment, the client computing device 110 includes a processing device, a display, and a camera, and a memory device that includes the interactive AR entertainment hub 120. In another embodiment, the client computing device includes a display and camera, but alternatively, the server computing device 140 includes the interactive AR entertainment hub.

Alternatively, the client computing devices 120(1)-120(N) may include a processing device, a display, and a memory device that operates the interactive AR entertainment hub. In one embodiment, the client computing device 110 may be a hand-held device such as a phone, tablet, portable gaming device, handheld game console, ultra-mobile computer, hand-held computer, digital still camera, digital video camera, portable media player, glasses, headsets, or the like. In another embodiment, the client computing device 110 may be less compact than a hand-held device, such as a desk mounted computer, laptop computer, digital console, or the like.

The client computing device 110 may include a processing device 112. The processing device 112 may include hardware (e.g., circuitry, dedicated logic, programmable logic, microcode, etc.), software (e.g., instructions run on a processing device to perform hardware simulation), or a combination thereof. In one implementation, the processing tasks may be performed by a processing device of one of the client computing devices 120(1)-120(N). In other implementations, other devices may perform the processing tasks (e.g., one or more devices of the network environment 100).

The client computing device may also include a display 114. The display 114 could be a liquid crystal display (LCD), or the like. The display 114 can be integrated with a touch screen. For example, the client computing device 110 could be a mobile phone and the display 114 is the display of the mobile phone.

The client computing device 110 may also include a camera device 116. In one embodiment, the camera 116 may be embedded in a housing of the client computing device 110. Alternatively, in a second embodiment, the camera 116 could be disposed on a surface of the client computing device 110. Alternatively, in a third embodiment, the camera 116 could be separate from the client computing device 110 and communicatively coupled to the client computing device 116.

The client computing device 110 also may include a memory device 118. The memory device 118 can be any type of memory and may include one or more devices, including volatile memory, nonvolatile memory, or any combination thereof. For example, the memory device 118 can be random access memory (RAM), read-only memory (ROM), a disk, a drive, embedded cache, or the like.

The interactive AR entertainment hub 120, which is further detailed in FIGS. 2-5, executes an entertainment hub by capturing real world images through a camera view. The system detects and processes a specified marker to initiate an AR character on the display along with programming objects that can be manipulated to change the color of features of the AR character or cause the AR character to perform an animation action on the display. As described herein, alternatively, the system scans the environment for planes to initiate an AR character. The system rewards the user when the user completes a task by performing an operation to store a reward token to a user profile associated with the user.

The data store 130 provides a repository for persistently storing and managing collections of data including storage for the user profile 132 and user tokens 134. In one embodiment, the data store 130 may include volatile memory, nonvolatile memory, or any combination thereof. The data store 130 can be organized as one or more databases, or the like. The data store 130 may also include multiple storage components (e.g., multiple drives or multiple disks) that may also span multiple computing devices (e.g., multiple server computers). The data store 130 can be part of a cloud computing system that hosts the storage as a service. In some implementations, the data store 130 may be a part of the server computing device 140. In some implementations, the data store 130 may be distributed among one or more of the client computing devices 110(1)-110(N). One or more of the devices of the network environment 100 may utilize the data store 130 to store public and private data.

One or more user profiles 132 may be stored in the data store 130. Each of the user profiles 132 can store information about one or more users, including account information, user preferences, user settings, personal information, login credentials, or the like. The user profile 132 may be a multi-user profile, such as a profile that includes a first account for a child and a second account for a parent or guardian. Alternatively, the user profile 132 can store other information associated with the interactive AR entertainment hub 120.

Each user of the interactive AR entertainment hub 120 can be associated with one of the user profiles 132. The user profiles 132 can be associated in a group of users or other associations.

The user data 134 may be stored in the data store 130. The user data 134 can include any data in connection with the user and its interactions with the interactive AR entertainment hub 120. For example, the user data 134 can store reward tokens that may be earned when the user completes a task by performing an operation in the interactive AR entertainment hub 120. For example, the tokens stored in the user data 134 may be used as a reward system or loyalty program. A restaurant or other type of business could use the reward tokens to drive traffic to the restaurant and maintain loyalty of its patrons. For example, the restaurant or business could define a threshold number of reward tokens as representing a discount on a future meal, to incentivize the parent to return to the restaurant at a future date. For another example, the reward token could be exchanged for a prize for the child, encouraging the child to pass the time engaging in the interactive AR entertainment hub 120. The diversion of the interactive AR entertainment hub 120 may help maintain a peaceful atmosphere for restaurant customers as the child and the child's parents wait for their meal. This would in turn incentivize customers to return to the restaurant.

The embodiments of the interactive AR entertainment hub 120 can include playful, AR STEM-based challenges. The playful, AR STEM-based challenges can turn restaurant tables into interactive game stations for kids to play with while helping parents entertain and educate their kids when eating out. According to a study, diners say that tech makes dining more fun. Kid-friendly restaurants benefit by attracting and retaining family diners. Other potential use cases for the interactive AR entertainment hub is optional subscription to premium STEM content for kids to play at home; and, cause marketing for user awareness and onboarding. In cause marketing, the interactive AR entertainment hub is used at schools within the footprint of the partner restaurant as part of a STEM outreach workshop using its educational curriculum in AR technology. The competitive advantage of the interactive AR entertainment hub is that it connects a community of schools, restaurants, and parents through AR educational gaming for children. Eventually, the interactive AR entertainment hub may be used in other verticals within the food industry, such as in grocery stores or the like. Lastly, individual features like AR coloring could be used in other industries like interior design or sold separately to schools.

Figure 2:
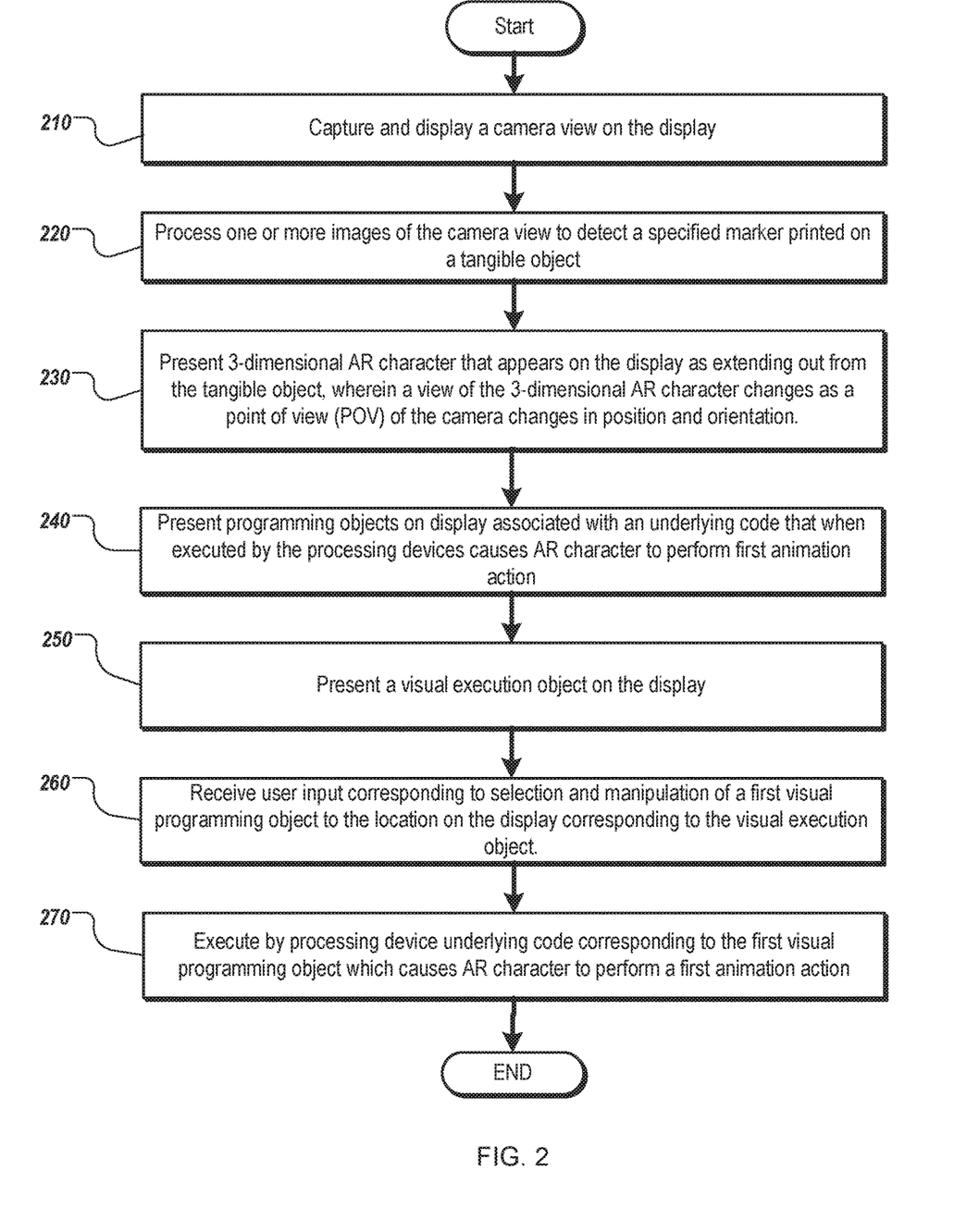
FIG. 2 is a flow diagram of a method of operations of an interactive AR entertainment hub to visually program a 3D model to perform animation actions by sending an event from the user device into AR space, in accordance with the embodiments of the present disclosure.

FIG. 2 is a flow diagram of a method of operations of an interactive AR entertainment hub to visually program a 3D model to perform animation actions by sending an event from the user device into AR space, in accordance with the embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), firmware, or a combination thereof. In some embodiments, the method 200 is performed by the AR interactive entertainment hub 120 in the client device 110(1) of FIG. 1. In another embodiment, the method 200 is performed by processing logic of the AR interactive entertainment hub 110 in the server device 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic captures and displays a camera view on a display. At operation 220, the processing logic processes one or more images of the camera view to detect a specified marker printed on a tangible object. Alternatively, the processing logic scans an environment to detect a plane without using a marker. At operation 230, the processing logic initiates an AR character to be displayed over the camera view, responsive to the specified marker being detected in the camera view. Alternatively, the processing logic can initiate the AR character responsive to a user selecting a point on a detected plane. In one embodiment, the processing logic presents the AR character as a 3-dimensional AR character that appears on the display as extending out from the tangible object. In another embodiment, the processing logic receives user input that places the AR character on a plane selected by the user. A view of the 3-dimensional AR character changes as a point of view (POV) of the camera changes in position and orientation. At operation 240, the processing logic presents visual programming objects on the display. Each of the visual programming objects is associated with underlying code that, when executed by the processing device, causes the AR character to perform an animation action on the display. At operation 250, the processing logic presents a visual execution object on the display. The visual execution object causes the underlying code of one or more of the visual programming objects to be executed when the one or more of the visual programming objects are manipulated by a user to a location on the display corresponding to the visual execution object. At operation 260, the processing logic receives user input corresponding to selection and manipulation of a first visual programming object to the location on the display corresponding to the visual execution object. At operation 270, the processing logic executes underlying code corresponding to the first visual programming object responsive to the user input. Execution of the underlying code corresponding to the first visual programming object causes the AR character to perform a first animation action on the display. Regardless of whether a marker or a detected plane is used as set forth above with respect to operations 210-230, the operations 240-270 can be similar for either scenario.

In a further embodiment, the processing logic receives additional user input corresponding to selection and manipulation of a second visual programming object to the location on the display corresponding to the visual execution object. Responsive to the additional user input, the processing logic executes underlying code corresponding to the second visual programming object. Execution of the underlying code corresponding to the second visual programming object causes the AR character to perform a second animation action on the display. The second animation action can be different than the first animation action.

In a further embodiment, the first visual programming object includes a first set of operations specified in the underlying code. The first set of operations can include a first operation to cause the AR character to perform the first animation action on the display and a second operation to cause a first audio item to be played by a speaker. The first audio item corresponding to the first animation action. A second visual programming object can include a second set of operations specified in the underlying code. The second set of operations can include a third operation to cause the AR character to perform a second animation action on the display and a fourth operation to cause a second audio item to be played by the speaker, the second audio item corresponding to the second animation action. The second animation action can be different than the first animation action and the second audio item being different than the first audio item.

In another embodiment, the first set of operations can include a first operation to cause the AR character to perform the first animation action on the display, a second operation to store a reward token to a user profile associated with the user, and a third operation to display a GUI element on the display, the GUI element associated with the reward token. In a further embodiment, a second visual programming object can include a second set and the second set can include a fourth operation to cause the AR character to perform a second animation action on the display, the second animation action being different than the first animation action, a fifth operation to store a second reward token to the user profile associated with the user, and a sixth operation to display a second GUI element on the display, the second GUI element associated with the second reward token.

Figure 3:
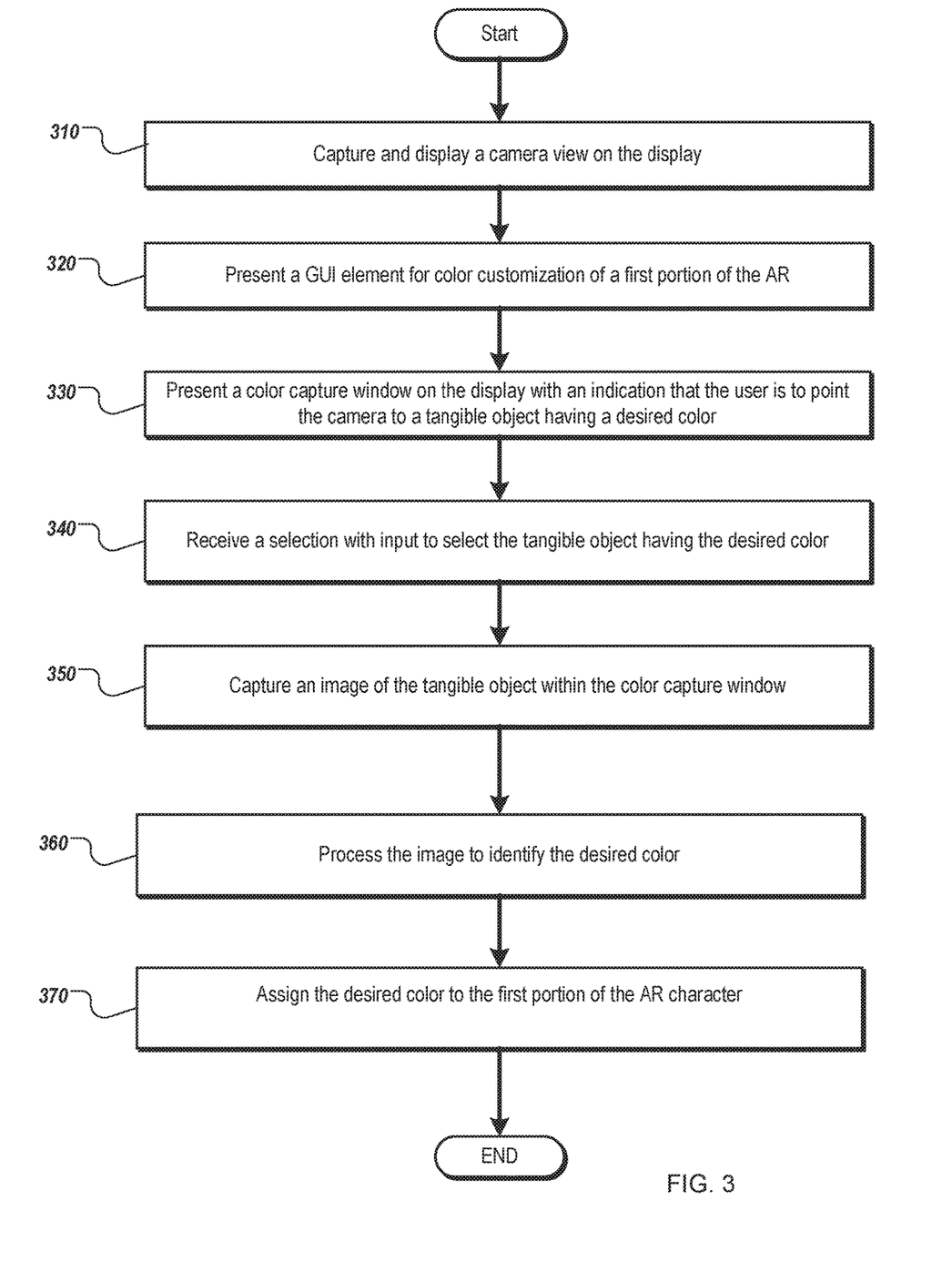
FIG. 3 is a flow diagram of a method of operations of an interactive AR entertainment hub to customize a color of the 3D models in AR space, using colors from real-world objects in real-time, in accordance with the embodiments of the present disclosure.

FIG. 3 is a flow diagram of a method 300 of operations of an interactive AR entertainment hub to customize a color of the 3D models in AR space, using colors from real-world objects in real-time, in accordance with the embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), firmware, or a combination thereof. In some embodiments, the method 300 is performed by the AR interactive entertainment hub 120 in the client device 110(1) of FIG. 1. In another embodiment, the method 300 is performed by processing logic of the AR interactive entertainment hub 110 in the server device 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic captures and displays a camera view on a display. At operation 320, the processing logic presents a GUI element for color customization of a first portion of the AR character. Responsive to activation of the GUI element, the processing logic presents a color capture window on the display with an indication that the user is to point the camera to a second tangible object having a desired color (operation 330). It should be noted that this permits selection of a real-world color palette, instead of selection of pre-determined set of pre-defined colors or selection of a color from a color graph as done conventionally. At operation 340, the processing logic receives a selection input to select the second tangible object having the desired color. Responsive to the selection input, the processing logic captures an image of the second tangible object within the color capture window (operation 350). At operation 360, the processing logic processes the image to identify the desired color. At operation 370, the processing logic assigns the desired color to the first portion of the AR character, and the method 300 ends.

In a further embodiment, after the desired color is assigned to the first portion, the processing logic captures and displays a subsequent camera view on the display. The processing logic processes one or more images of the subsequent camera view to detect the specified marker printed on the tangible object (or scanning planes). The processing logic initiates the AR character, having the first portion assigned the desired color, to be displayed over the camera view, responsive to the specified marker being detected in the camera view or responsive to a selected point being detected in the specified plane.

Figure 4:
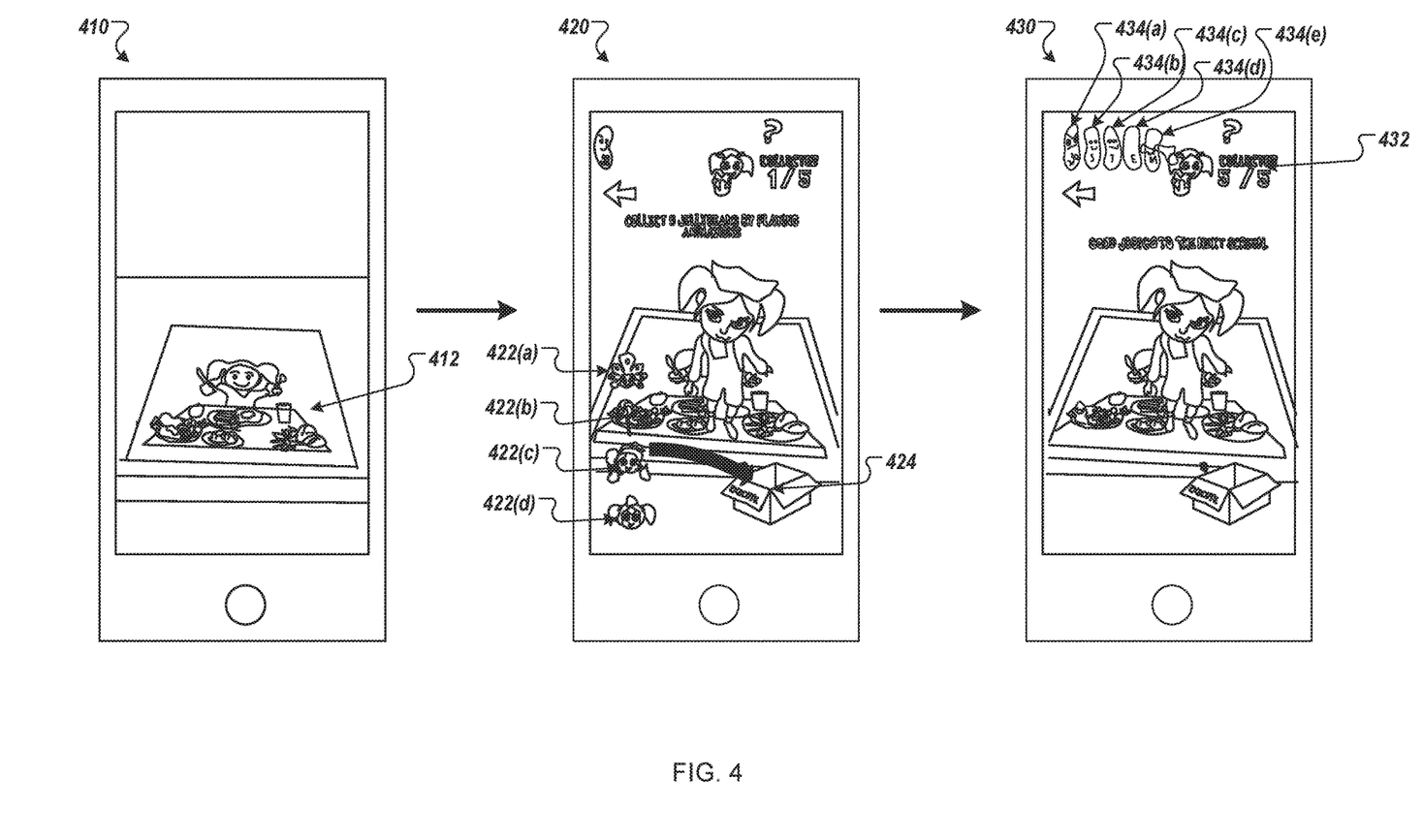
FIG. 4 illustrates a sequence of steps, performed by a user with the interactive AR entertainment hub, to execute underlying code that causes the AR figure to perform an animation action, in accordance with embodiments of the present disclosure.

FIG. 4 illustrates a sequence of steps (e.g., via a series of views of one or more user interfaces), performed by a user with the interactive AR entertainment hub (e.g., interactive AR entertainment hub 120 of FIG. 1), to execute underlying code that causes the AR figure to perform an animation action, in accordance with embodiments of the present disclosure.

View 410 is displayed responsive to the camera being pointed at a real-world image target and the interactive AR entertainment hub capturing and displaying a camera view on the display. In this example, the real world target image is a napkin (412) on a table top (e.g., which is displayed on the user interface and viewed through the camera viewer of a cell phone). The napkin is printed with a 2-dimensional image of the AR character "Sharon" which is recognized by the interactive AR entertainment hub as a specified marker. In an alternative embodiment, the interactive AR entertainment hub can scan an environment using the camera view to detect a specified plane. A user can place an AR character on the specified plane to activate the AR model as described herein.

View 420 is displayed responsive to the interactive AR entertainment hub detecting the specified marker. The interactive AR entertainment hub presents a three dimensional AR image that appears on the user interface to emerge from napkin (e.g., once the processor recognizes the specified marker).

View 420 further illustrates emojis (422a-d) (e.g., programming objects) that the user manipulates to execute animations in AR space. Emojis (422a-d) are two dimensional images that are displayed along with the three dimensional AR character on the user interface after the processor recognizes the specified marker. The user manipulates each emoji 422 separately and each emoji 422 is associated with a new task or programming command to teach STEM based learning. The user manipulates the emojis 422 by virtually dragging them across the user interface and virtually depositing them into the cardboard box image (424). In some embodiments, each emoji is associated with an underlying code to execute an animation depicting the 3-dimensional AR character Sharon dancing in a certain way.

View 430 illustrates the reward token animations (434a-e) (e.g., reward tokens) that are collected after the user successfully completes one or more actions. View 430 further illustrates a score 432 (e.g., collected 5/5) associated with the number of reward tokens collected. The reward tokens may be used to drive return business to the restaurant that offers the app to its customers. For example, the reward tokens could be redeemed for coupons to the restaurant, incentivizing the parents of the child user to return to the restaurant at a later date. In addition, because the app engages a child while waiting for food to arrive in the restaurant, the child is less likely to misbehave and disturb others in the restaurant. As the app may improve the atmosphere of the restaurant for all patrons including the child's parents, the app provides additional incentives for customers to continue to patronize the restaurant.

Figure 5A:
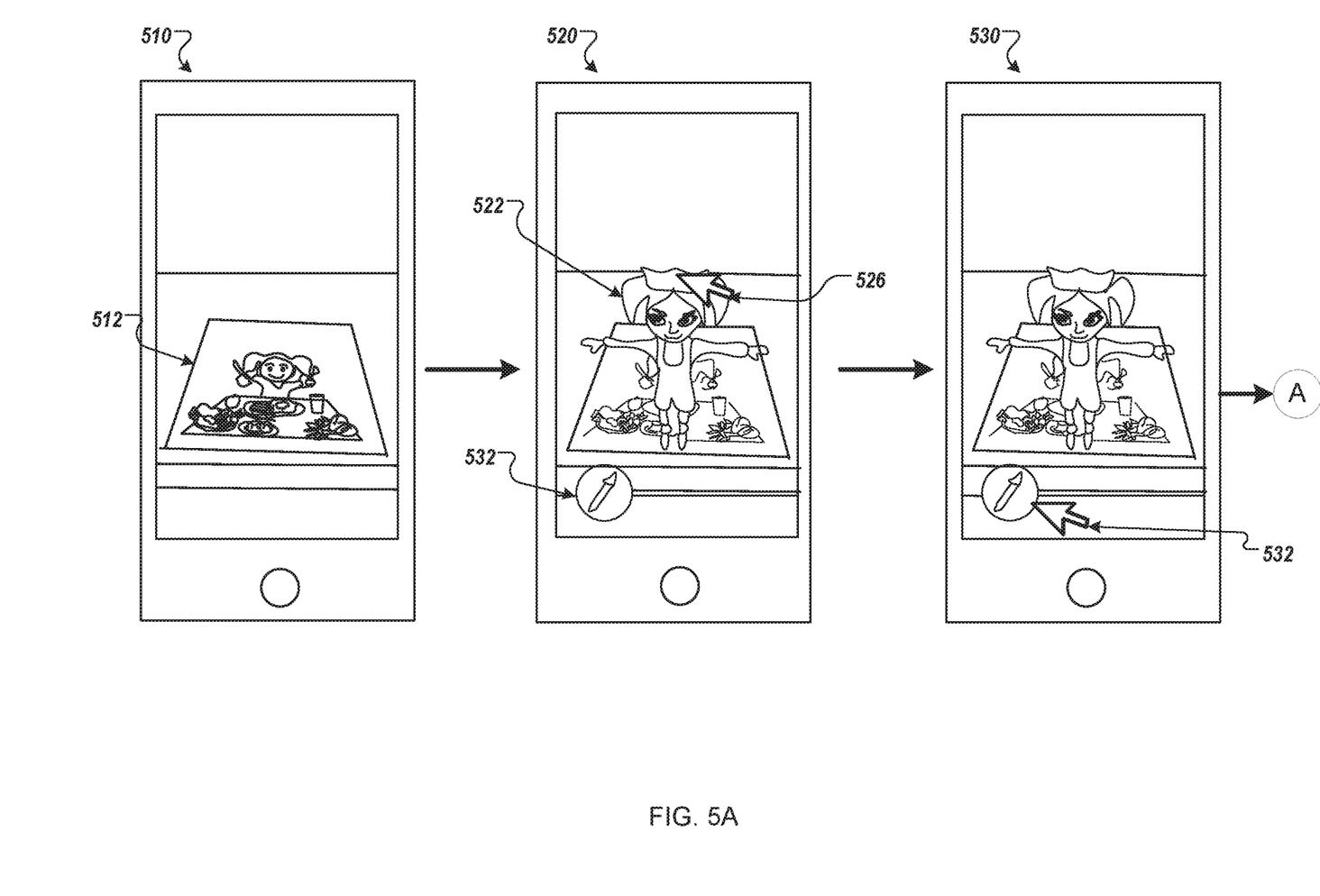
FIGS. 5A-5B illustrate a sequence of steps, performed by a user with the interactive AR entertainment hub to select a color from a real-world object for a portion of the AR figure for an item of an AR figure, in accordance with embodiments of the present disclosure.
Figure 5B:
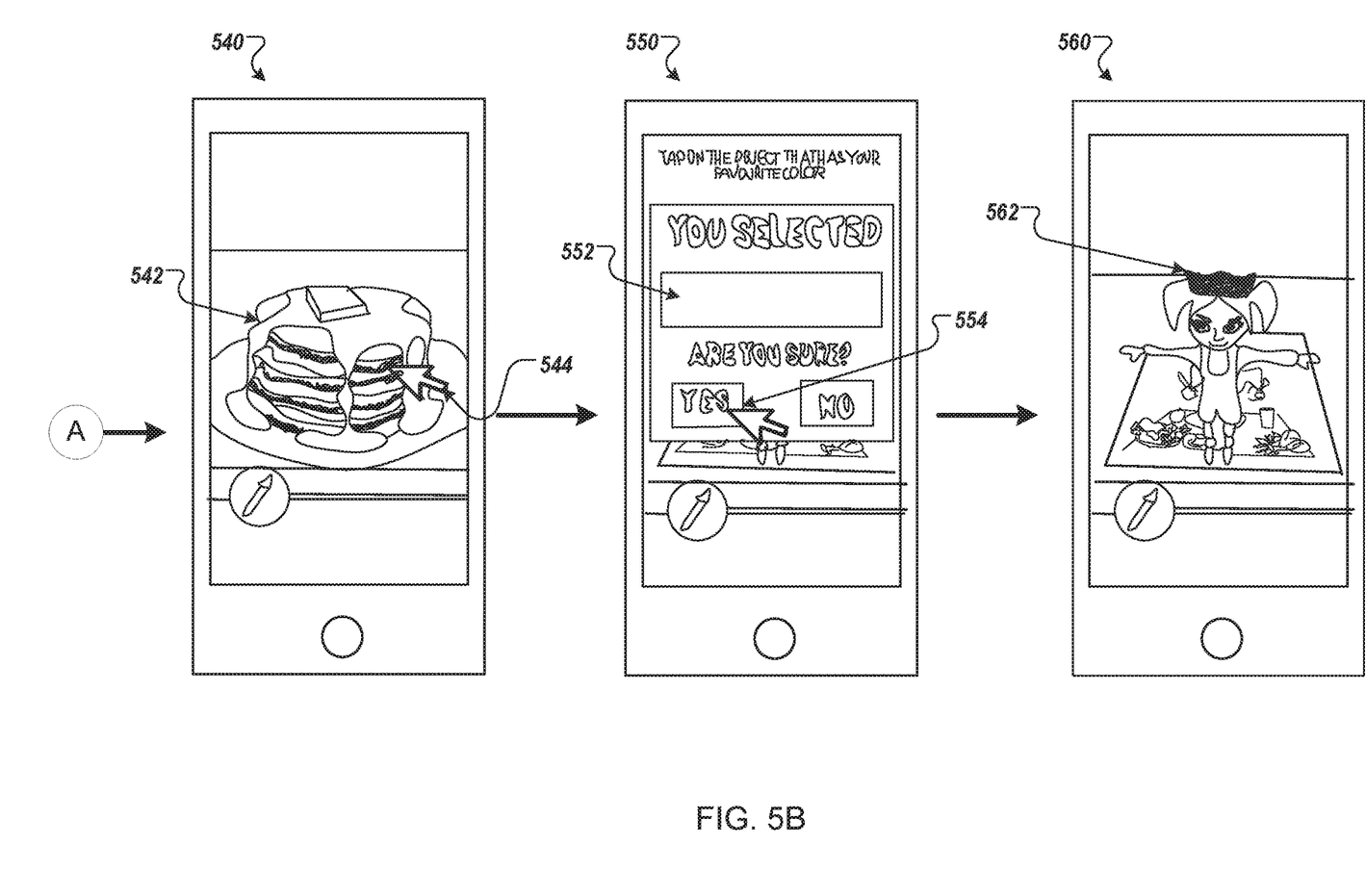

FIGS. 5A-5B illustrate a sequence of steps (e.g., via a series of views of one or more user interfaces), performed by a user with the interactive AR entertainment hub to select a color from a real-world object for an item of an AR, in accordance with embodiments of the present disclosure.

View 510 is displayed responsive to the camera being pointed at a real-world image target and the interactive AR entertainment hub capturing and displaying a camera view on the display. In this example, the real world image is a napkin (512) on a table top (e.g., which is displayed on the user interface and viewed through the camera lens of a cell phone). In this example, the napkin is printed with a two dimensional image of the AR character "Sharon" which is recognized by the system as the specified marker.

View 520 is displayed responsive to the interactive AR entertainment hub detecting the specified marker (or scanning to detect designated planes). The interactive AR entertainment hub presents a three dimensional AR image (522) that appears on the user interface to emerge from napkin (e.g., after the processor recognizes the specified marker or the AR character is placed on a point on the plane). In view 520, the user is prompted to select a portion (e.g., an art asset) of the three dimensional AR image 522 to color. In view 520, the user selects the hair bow (526) of the three dimensional AR image 522.

View 530 illustrates the color picker button (532), which in view 530 is depicted as an eyedropper. In view 530, the user selects the color picker button 532, which triggers display of view 540.

FIG. 5B is a continuation of 5A and illustrates the selection of a color value as well as the display of the art asset of the three dimensional AR image 522 in the color selected by the user from the real world object.

View 540 illustrates a real-world object, in this embodiment, a stack of pancakes on a plate (542), that the user views on the user interface through the camera of the user device. In view 540, by tapping the screen, the user selects a section on the display of the real-world object that has the desired color the user wishes to color the art asset selected by the user in view 520 of FIG. 5A. In this example, the illustration depicts the user selecting the darkened edges of the real-world pancakes (544) displayed on the user interface, which triggers view 550 (e.g., a color viewer window 552 to appear in view 550).

View 550 illustrates the color viewer window (552) displaying the color the user selected. In a conventional app, a user can color an object by selecting a color from a limited spectrum of predefined colors (e.g., that are assigned a pixel value). For example, a conventional app may allow a user to color an object responsive to selecting a color from the nine colors of red, blue, yellow, green, orange, purple, black, white, and brown. The interactive AR entertainment hub allows a user to select a color from a much broader spectrum of colors. The interactive AR entertainment hub permits a user to select any color that can be displayed via a user device (e.g., any color displayed via the user interface responsive to the camera capturing a real-world image). The colors available for selection may be any color of real-world objects that can be represented on a screen, rather than just a limited spectrum of predefined colors with pixel values. View 540 may illustrate a first user interface element to accept the color (e.g., "Yes" button 554) and a second user interface element to not accept the color (e.g., "No" button).

View 560 is responsive to the user selecting the "Yes" button (554) which triggers the processor to assign the selected color value to the selected art asset of the three dimensional AR image 522.

View 560 illustrates the user pointing the camera to the specified marker (e.g., 2-dimensional image of the AR character Sharon) and the interactive AR entertainment hub displaying the three dimensional AR image 522 with the selected art asset, colored with the selected value (562). As the user points the camera at the 2-dimensional image from different view angles, different angles (e.g., front, back, side, etc.) of the three dimensional AR image 522 may be displayed via the user interface. The art asset may be colored with the selected value 562 at each of the view angles (e.g., front, back, and sides of the art asset may be colored with the selected value 562).

Figure 6:
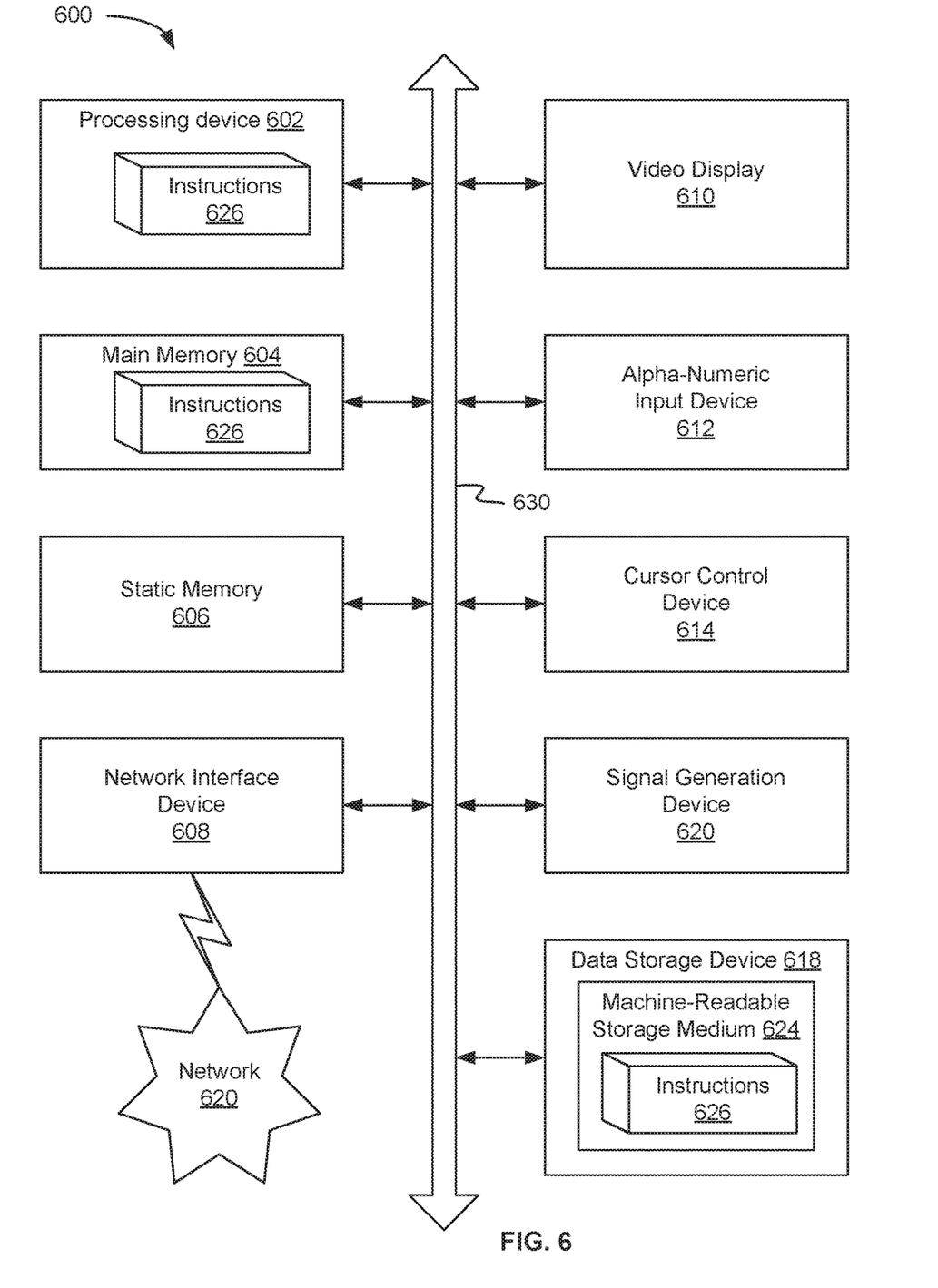
FIG. 6 is a block diagram of an example computer system in which embodiments of the present disclosure can operate.

FIG. 6 illustrates an example machine of a computer system 600 within which a set of instructions, for causing the system to perform any one or more of the methodologies discussed herein, can be executed. In some embodiments, the computer system 600 can correspond to any one of the client computing devices 110 of FIG. 1 that can be used to perform the operations described herein. In other embodiments, the computer system 600 can correspond to server computing device 140 of FIG. 1. In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable storage medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media.

The computer system 600 may further include a video display 610, an alpha-numeric input device 612, a cursor control device 614, and/or a signal generation device 620, each coupled to the bus 630. The computer system 600 may include more or less components than those illustrated in FIG. 6.

In one embodiment, the instructions 626 include instructions to implement functionality corresponding to the interactive AR entertainment hub described herein. While the machine-readable storage medium 624 is shown in an example embodiment to be a single medium, the term "machine-readable storage medium" or "computer-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A portable device comprising:
a camera;
a display;
a memory device; and
a processing device operability coupled to the memory device, the display, and the camera, wherein the processing device is to execute an interactive augmented reality (AR) entertainment hub to:
capture and display a camera view on the display;
process one or more images of the camera view to detect a specified marker printed on a tangible object or scan an environment to detect a specified plane;
initiate an AR character to be displayed over the camera view responsive to the specified marker being detected in the camera view;
present a plurality of visual programming objects on the display, wherein each of the plurality of visual programming objects is associated with underlying code that, when executed by the processing device, causes the AR character to perform an animation action on the display;
present a visual execution object on the display, wherein the visual execution object causes the underlying code of one or more of the plurality of visual programming objects to be executed when the one or more of the plurality of visual programming objects are manipulated by a user to move the one or more of the plurality of visual programming objects to a first location on the display corresponding to the visual execution object, wherein the visual execution object is unable to be manipulated by the user;

receive user input corresponding to selection and manipulation of a first visual programming object to move the first visual programming object from a second location to the first location on the display corresponding to the visual execution object;

responsive to the user input, execute underlying code corresponding to the first visual programming object, wherein execution of the underlying code corresponding to the first visual programming object causes the AR character to perform a first animation action on the display.

2. The portable device of claim 1, wherein the interactive AR entertainment hub further to:

receive additional user input corresponding to selection and manipulation of a second visual programming object to the location on the display corresponding to the visual execution object; and responsive to the additional user input, execute underlying code corresponding to the second visual programming object, wherein execution of the underlying code corresponding to the second visual programming object causes the AR character to perform a second animation action on the display, the second animation action being different than the first animation action.

3. The portable device of claim 1, wherein the AR character is a 3-dimensional AR character that appears on the display as extending out from the tangible object or placed on a point detected from the plane, wherein a view of the 3-dimensional AR character changes as a point of view (POV) of the camera changes in position and orientation.

4. The portable device of claim 1, wherein the interactive AR entertainment hub further to:

present a GUI element for color customization of a first portion of the AR character;

responsive to activation of the GUI element, present a color capture window on the display with an indication that the user is to point the camera to a second tangible object having a desired color;

receive a selection input to select the second tangible object having the desired color; and responsive to the selection input, capture an image of the second tangible object within the color capture window;

process the image to identify the desired color; and assign the desired color to the first portion of the AR character.

5. The portable device of claim 4, wherein the interactive AR entertainment hub further to:

after the desired color is assigned to the first portion, capture and display a subsequent camera view on the display;

process one or more images of the subsequent camera view to detect the specified marker printed on the tangible object or scan the environment to detect the specified plane; and initiate the AR character, having the first portion assigned the desired color, to be displayed over the camera view, responsive to the specified marker being detected in the camera view or responsive to a selected point being detected in the specified plane.

6. The portable device of claim 1, further comprising a speaker coupled to the processing device, wherein the first visual programming object comprises a first set of operations specified in the underlying code, wherein the first set of operations comprises:

a first operation to cause the AR character to perform the first animation action on the display; and a second operation to cause a first audio item to be played by the speaker, the first audio item corresponding to the first animation action, wherein a second visual programming object of the plurality of visual programming objects comprises a second set of operations specified in the underlying code, wherein the second set of operations comprises:

a third operation to cause the AR character to perform a second animation action on the display, the second animation action being different than the first animation action; and a fourth operation to cause a second audio item to be played by the speaker, the second audio item corresponding to the second animation action and the second audio item being different than the first audio item.

7. The portable device of claim 1, wherein the first visual programming object comprises a first set of operations specified in the underlying code, wherein the first set of operations comprises:

a first operation to cause the AR character to perform the first animation action on the display; and a second operation to store a reward token to a user profile associated with the user; and a third operation to display a GUI element on the display, the GUI element associated with the reward token.

8. The portable device of claim 7, wherein a second visual programming object of the plurality of visual programming objects comprises a second set of operations specified in the underlying code, wherein the second set of operations comprises:

a fourth operation to cause the AR character to perform a second animation action on the display, the second animation action being different than the first animation action;

a fifth operation to store a second reward token to the user profile associated with the user; and a sixth operation to display a second GUI element on the display, the second GUI element associated with the second reward token.

9. A method comprising:

capturing and displaying a camera view on a display;

processing one or more images of the camera view to detect a specified marker printed on a tangible object or scan an environment to detect a specified plane;

initiating an AR character to be displayed over the camera view, responsive to the specified marker being detected in the camera view or responsive to a selected point on the specified plane being detected in the camera view;

presenting a plurality of visual programming objects on the display, wherein each of the plurality of visual programming objects is associated with underlying code that, when executed by a processing device, causes the AR character to perform an animation action on the display;

presenting a visual execution object on the display, wherein the visual execution object causes the underlying code of one or more of the plurality of visual programming objects to be executed when the one or more of the plurality of visual programming objects are manipulated by a user to move the one or more of the plurality of visual programming objects to a first location on the display corresponding to the visual execution object, wherein the visual execution object is unable to be manipulated by the user;

receiving user input corresponding to selection and manipulation of a first visual programming object to move the first visual programming object from a second location to the first location on the display corresponding to the visual execution object; and responsive to the user input, executing underlying code corresponding to the first visual programming object, wherein execution of the underlying code corresponding to the first visual programming object causes the AR character to perform a first animation action on the display.

10. The method of claim 9, further comprising:
receiving additional user input corresponding to selection and manipulation of a second visual programming object to the location on the display corresponding to the visual execution object; and
responsive to the additional user input, executing underlying code corresponding to the second visual programming object, wherein execution of the underlying code corresponding to the second visual programming object causes the AR character to perform a second animation action on the display, the second animation action being different than the first animation action.

11. The method of claim 9, wherein the AR character is a 3-dimensional AR character that appears on the display as extending out from the tangible object or a selected point on the specified plane, wherein a view of the 3-dimensional AR character changes as a point of view (POV) of the camera changes in position and orientation.

12. The method of claim 9, further comprising:
presenting a GUI element for color customization of a first portion of the AR character;
responsive to activation of the GUI element, presenting a color capture window on the display with an indication that the user is to point the camera to a second tangible object having a desired color;
receiving a selection input to select the second tangible object having the desired color; and
responsive to the selection input,
capturing an image of the second tangible object within the color capture window;
processing the image to identify the desired color; and
assigning the desired color to the first portion of the AR character.

13. The method of claim 12, further comprising:
after the desired color is assigned to the first portion, capturing and displaying a subsequent camera view on the display;
processing one or more images of the subsequent camera view to detect the specified marker printed on the tangible object or a selected point on the specified plane; and
initiating the AR character, having the first portion assigned the desired color, to be displayed over the camera view, responsive to the specified marker being detected in the camera view or responsive to the selected point being detected.

14. The method of claim 9, wherein executing the underlying code corresponding to the first visual programming object comprises:
performing a first operation to cause the AR character to perform the first animation action on the display; and
performing a second operation to cause a first audio item to be played by a speaker, the first audio item corresponding to the first animation action.

15. The method of claim 14, further comprising:
executing underlying code corresponding to a second visual programming object of the plurality of visual programming objects, wherein executing the underlying code corresponding to the second visual programming object comprises:
performing a third operation to cause the AR character to perform a second animation action on the display, the second animation action being different than the first animation action; and
performing a fourth operation to cause a second audio item to be played by the speaker, the second audio item corresponding to the second animation action and the second audio item being different than the first audio item.

16. The method of claim 9, wherein executing the underlying code corresponding to the first visual programming object comprises:
performing a first operation to cause the AR character to perform the first animation action on the display; and
performing a second operation to store a reward token to a user profile associated with the user; and
performing a third operation to display a GUI element on the display, the GUI element associated with the reward token.

17. The method of claim 16, further comprising:
executing a second visual programming object of the plurality of visual programming objects, wherein executing the second visual programming object comprises:
performing a fourth operation to cause the AR character to perform a second animation action on the display, the second animation action being different than the first animation action;
performing a fifth operation to store a second reward token to the user profile associated with the user; and
performing a sixth operation to display a second GUI element on the display, the second GUI element associated with the second reward token.

18. A non-transitory computer-readable storage medium storing instructions that, when executed by a processing device, causes the processing device to:
capture and displaying a camera view on a display;
process one or more images of the camera view to detect a specified marker printed on a tangible object or scan an environment to detect a specified plane;
initiate an AR character to be displayed over the camera view, responsive to the specified marker being detected in the camera view or responsive to a selected point being detected in the specified plane;
present a plurality of visual programming objects on the display, wherein each of the plurality of visual programming objects is associated with underlying code that, when executed by the processing device, causes the AR character to perform an animation action on the display;
present a visual execution object on the display, wherein the visual execution object causes the underlying code of one or more of the plurality of visual programming objects to be executed when the one or more of the plurality of visual programming objects are manipulated by a user to move the one or more of the plurality of visual programming objects to a first location on the display corresponding to the visual execution object, wherein the visual execution object is unable to be manipulated by the user;

receive user input corresponding to selection and manipulation of a first visual programming object to move the first visual programming object from a second location to the first location on the display corresponding to the visual execution object; and responsive to the user input, execute underlying code corresponding to the first visual programming object, wherein execution of the underlying code corresponding to the first visual programming object causes the AR character to perform a first animation action on the display.

19. The non-transitory computer-readable storage medium of claim 18, the processing device further to:

receive additional user input corresponding to selection and manipulation of a second visual programming object to the location on the display corresponding to the visual execution object; and responsive to the additional user input, execute underlying code corresponding to the second visual programming object, wherein execution of the underlying code corresponding to the second visual programming object causes the AR character to perform a second animation action on the display, the second animation action being different than the first animation action.

20. The non-transitory computer-readable storage medium of claim 18, the processing device further to:

present a GUI element for color customization of a first portion of the AR character;

responsive to activation of the GUI element, presenting a color capture window on the display with an indication that the user is to point the camera to a second tangible object having a desired color;

receive a selection input to select the second tangible object having the desired color;

responsive to the selection input,
  capture an image of the second tangible object within the color capture window;
  process the image to identify the desired color; and
  assign the desired color to the first portion of the AR character;

after the desired color is assigned to the first portion, capture and display a subsequent camera view on the display;

process one or more images of the subsequent camera view to detect the specified marker printed on the tangible object or scan the environment to detect the specified plane; and initiate the AR character, having the first portion assigned the desired color, to be displayed over the camera view, responsive to the specified marker being detected in the camera view or responsive to a selected point being detected in the specified plane.

* * * * *